United States Patent
Liu et al.

(10) Patent No.: US 11,138,147 B2
(45) Date of Patent: Oct. 5, 2021

(54) CPU AND MULTI-CPU SYSTEM MANAGEMENT METHOD

(71) Applicant: HUAWEI TECHNOLOGIES CO., LTD., Guangdong (CN)

(72) Inventors: Gang Liu, Hangzhou (CN); Ben Chen, Hangzhou (CN); Liwei Cao, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/692,359

(22) Filed: Aug. 31, 2017

(65) Prior Publication Data
US 2017/0364475 A1    Dec. 21, 2017

Related U.S. Application Data

(63) Continuation of application No. PCT/CN2015/099589, filed on Dec. 29, 2015.

(51) Int. Cl.
*G06F 15/80* (2006.01)
*G06F 15/173* (2006.01)

(52) U.S. Cl.
CPC ........ *G06F 15/8023* (2013.01); *G06F 15/173* (2013.01); *G06F 15/17343* (2013.01)

(58) Field of Classification Search
CPC ............. G06F 15/17343; G06F 15/173; G06F 15/8023
See application file for complete search history.

(56) References Cited

U.S. PATENT DOCUMENTS

| 6,516,429 | B1 | 2/2003 | Bossen et al. |
| 6,757,788 | B2 | 6/2004 | Kawamoto et al. |
| 9,521,076 | B2* | 12/2016 | Ravindran ............. H04L 45/72 |
| 2003/0174709 | A1* | 9/2003 | Shankar ................. H04L 41/12 370/395.31 |
| 2007/0005906 | A1 | 1/2007 | Miyamoto |

(Continued)

FOREIGN PATENT DOCUMENTS

| CN | 102521201 A | 6/2012 |
| CN | 103020004 A | 4/2013 |

(Continued)

OTHER PUBLICATIONS

Thomas Warschko: "Commodity CPUs go SMP", Architect of an open world, bull extreme computing, Jan. 1, 2010, XP055427581, 10 pages.

(Continued)

*Primary Examiner* — Jacob Petranek
(74) *Attorney, Agent, or Firm* — Huawei Technologies Co., Ltd.

(57) ABSTRACT

The present disclosure provides a multi-CPU system, where the multi-CPU system includes: at least two Quick-Path Interconnect QPI domains, a first node controller NC group, and a second node controller NC group; according to a CPU route configuration, there is at least one CPU that can access a CPU in another QPI domain by using the first NC group; and there is at least one CPU that can access a CPU in another QPI domain by using the second NC group. According to this topology, hot swap of an NC can be implemented while the system is relatively slightly affected.

18 Claims, 6 Drawing Sheets

(56) References Cited

U.S. PATENT DOCUMENTS

| | | | |
|---|---|---|---|
| 2007/0019558 A1* | 1/2007 | Vasseur | H04L 41/5022 370/248 |
| 2008/0059610 A1 | 3/2008 | Lin et al. | |
| 2009/0144476 A1* | 6/2009 | Cai | G06F 13/4063 710/302 |
| 2010/0122008 A1 | 5/2010 | Goss et al. | |
| 2010/0251005 A1 | 9/2010 | Kitano | |
| 2010/0287279 A1* | 11/2010 | Vaidyanathan | G06F 9/5066 709/226 |
| 2011/0010468 A1 | 1/2011 | Hu et al. | |
| 2011/0161592 A1 | 6/2011 | Nachimuthu et al. | |
| 2011/0179311 A1 | 7/2011 | Nachimuthu et al. | |
| 2011/0320861 A1 | 12/2011 | Bayer et al. | |
| 2013/0031334 A1* | 1/2013 | El-Essawy | H04L 45/06 712/30 |
| 2013/0073814 A1 | 3/2013 | Wang et al. | |
| 2013/0103975 A1 | 4/2013 | Tan et al. | |
| 2014/0310555 A1* | 10/2014 | Schulz | G06F 11/2002 714/4.2 |
| 2015/0058302 A1 | 2/2015 | Abney, III et al. | |
| 2015/0067229 A1 | 3/2015 | Connor et al. | |
| 2015/0081977 A1 | 3/2015 | Kottapalli et al. | |
| 2015/0095008 A1* | 4/2015 | Wang | G06F 12/0837 703/20 |
| 2015/0244607 A1* | 8/2015 | Han | H04L 45/02 370/254 |
| 2015/0370661 A1 | 12/2015 | Swanson et al. | |
| 2016/0134524 A1* | 5/2016 | Beshai | H04L 45/44 370/406 |
| 2016/0328357 A1 | 11/2016 | Liu et al. | |
| 2017/0163443 A1* | 6/2017 | Chen | H04L 12/4633 |

FOREIGN PATENT DOCUMENTS

| | | |
|---|---|---|
| CN | 103530191 A | 1/2014 |
| CN | 104899179 A | 9/2015 |
| JP | 2010231723 A | 10/2010 |
| RU | 2429529 C2 | 9/2011 |

OTHER PUBLICATIONS

Warschko,Thomas; Teamleiter HPC"Extreme Computing",dated Dec. 31, 2020,total 29 pages.

* cited by examiner

--Prior Art--

CPU AND MULTI-CPU SYSTEM MANAGEMENT METHOD

CROSS-REFERENCE TO RELATED APPLICATION

This application is a continuation of International Application No. PCT/CN2015/099589, filed on Dec. 29, 2015, the disclosure of which is hereby incorporated by reference in its entirety.

TECHNICAL FIELD

The present disclosure relates to the computer field, and in particular, to a CPU and a multi-CPU system management method.

BACKGROUND

In a Non-Uniform Memory Access Architecture (NUMA) system, Central Processing Unit (CPU) may be interconnected through an interconnect bus to form a multi-CPU system. A common interconnect bus is a Quick-Path Interconnect protocol (QPI).

However, due to component resource limitation, for example, due to a limited quantity of CPU interconnect ports, using only the interconnect bus can implement interconnection between a maximum of 8 CPUs. To implement interconnection between more than 8 CPUs, a node controller (Node Controller, NC) needs to be used.

FIG. 1 shows a multi-CPU system structure in the prior art, including a node controller 111, a node controller 112, and 8 CPUs. A CPU 121, a CPU 122, a CPU 123, and a CPU 124 form a QPI domain, and a CPU 125, a CPU 126, a CPU 127, and a CPU 128 form another QPI domain. CPUs in a QPI domain may communicate with each other through a QPI bus between the CPUs. To implement communication between CPUs in different QPI domains, an NC needs to be used.

In a system running process, cross-NC access is performed using a single path, which leads to a relatively long system delay. In a case of reduced reliability, an NC of low reliability needs to be removed and replaced. However, according to the architecture in FIG. 1, access to another domain by a CPU is affected during NC replacement.

SUMMARY

Embodiments of the present disclosure propose a multi-CPU system architecture, where 2 NC groups are available to CPUs, and a CPU can select an NC group that provides a highest speed of accessing a target NC, which improves overall efficiency of a system.

According to a first aspect, an embodiment of the present disclosure provides a CPU, which may serve as a main CPU that manages a multi-CPU system, where the multi-CPU system includes: a first Quick-Path Interconnect QPI domain, a second QPI domain, a first node controller NC group, and a second NC group, where the first NC group is connected to the first QPI domain and the second QPI domain, the second NC group is connected to the first QPI domain and the second QPI domain, each QPI domain includes at least one CPU, the main CPU belongs to the first QPI domain or the second QPI domain, and the main CPU is configured to: when an NC in the first NC group is to be removed, control all CPUs in the multi-CPU system that perform cross-domain access by using the first NC group, to switch, by modifying a route configuration, to perform cross-domain access by using the second NC group.

By applying this method, an NC can be hot-removed, which reduces impact caused by NC removal onto multi-CPU system performance.

In a first possible implementation manner of the first aspect, the main CPU being configured to control, all CPUs in the multi-CPU system that perform cross-domain access by using the first NC group, to switch, by modifying a route configuration, to perform cross-domain access by using the second NC group specifically includes: the main CPU being configured to: instruct the CPUs that perform cross-domain access by using the first NC group, to configure a recorded data state to an invalid state; initiate system silence to configure all CPUs in the multi-CPU system to a silent state; instruct the CPUs that perform cross-domain access by using the first NC group, to configure a port that is in a route register and that accesses a CPU in another domain, to a port that performs cross-domain access by using the second NC group; and initiate cancellation of system silence.

This implementation manner provides a specific manner of implementing NC hot-removal by modifying a CPU route configuration.

In a second possible implementation manner of the first aspect, the main CPU is further configured to: after the NC to be removed is removed and a target NC is added to the first NC group and establishes a topological relationship with an original NC in the first NC group, control at least one CPU that is in the multi-CPU system and that performs cross-domain access by using the second NC group, to switch, by modifying a route configuration, to perform cross-domain access by using the first NC group.

This implementation manner provides an NC hot-remove technology. An NC adding process may be an independent solution or may combine with the first aspect or the first possible implementation manner of the first aspect to form a combined solution.

In a third possible implementation manner of the first aspect, the main CPU is further configured to: after the NC to be removed is removed and a target NC is added to the first NC group, instruct at least one CPU that performs cross-domain access by using the first NC group, to configure a recorded data state to the invalid state; initiate system silence to configure all CPUs in the multi-CPU system to the silent state; establish a topological relationship between the target NC and an original NC in the first NC group; instruct the at least one CPU to configure a port that is in a route register and that accesses a CPU in another domain, to a port that performs cross-domain access by using the second NC group; and initiate cancellation of system silence.

This solution provides a more detailed NC hot-remove technology.

In a fourth possible implementation manner of the first aspect, the main CPU is further configured to: after a target NC is added into the first NC group, send an instruction to at least one CPU that performs cross-domain access by using the second NC group, and instruct the at least one CPU to set data states corresponding to M cross-domain sink CPUs in recorded data states to an invalid state, where the data states recorded by the CPU correspond to a total of N cross-domain sink CPUs, and M<N; initiate system silence to configure all CPUs in the multi-CPU system to a silent state; modify a route register configuration of the at least one CPU, so as to configure a port that is in a route register and that accesses the M CPUs, to a port that performs cross-domain access by using the first NC group; and cancel the system silence after finishing modifying the route register configuration.

By applying the fourth possible implementation manner of the first aspect, depending on different sink nodes, some CPUs may be selected to change a route, and routes of remaining CPUs keep unchanged.

According to a second aspect, a CPU is provided, which serves as a main CPU that manages a multi-CPU system, where the multi-CPU system includes: a first Quick-Path Interconnect QPI domain, a second QPI domain, a first node controller NC group, and a second NC group, where the first NC group is connected to the first QPI domain and the second QPI domain, the second NC group is connected to the first QPI domain and the second QPI domain, each QPI domain includes at least one CPU, the main CPU belongs to the first QPI domain or the second QPI domain, and the main CPU is configured to: when a target NC in the first NC group is to be removed, control all CPUs in the multi-CPU system that perform cross-domain access by using the target NC, to switch, by modifying a route configuration, to perform cross-domain access by using the second NC group.

This solution can implement NC hot-removal.

In a first possible implementation manner of the second aspect, the main CPU being configured to control all CPUs in the multi-CPU system that perform cross-domain access by using the target NC, to switch, by modifying a route configuration, to perform cross-domain access by using the second NC group specifically includes: the main CPU being configured to: instruct the CPUs that perform cross-domain access by using the target NC, to configure a recorded data state to an invalid state; initiate system silence to configure all CPUs in the multi-CPU system to a silent state; instruct remaining NCs in the first NC group to update a route configuration to isolate the target NC, and instruct the CPUs that perform cross-domain access by using the target NC, to configure a port that is in a route register and that accesses a CPU in another domain, to a port that performs cross-domain access by using the second NC group; and initiate cancellation of system silence.

According to a third aspect, a CPU is provided, which serves as a main CPU that manages a multi-CPU system, where the multi-CPU system includes: a first Quick-Path Interconnect QPI domain, a second QPI domain, a first node controller NC group, and a second NC group, where the first NC group is connected to the first QPI domain and the second QPI domain, the second NC group is connected to the first QPI domain and the second QPI domain, each QPI domain includes at least one CPU, the main CPU belongs to the first QPI domain or the second QPI domain, and the main CPU is configured to:

when a target NC is added to the first NC group, control at least one CPU that is in the first QPI domain and that performs cross-domain access by using the second NC group, to switch, by modifying a route configuration, to perform cross-domain access by using the target NC, where the target NC is connected to the first QPI domain.

In a first possible implementation manner of the third aspect, an NC adding technology is provided.

In a first possible implementation manner of the third aspect, the main CPU being configured to control at least one CPU that is in the first QPI domain and that performs cross-domain access by using the second NC group, to switch, by modifying a route configuration, to perform cross-domain access by using the target NC specifically includes: the main CPU being configured to: instruct the at least one CPU to configure a data state to an invalid state; initiate system silence to configure all CPUs in the multi-CPU system to a silent state; instruct the target NC to establish a topological relationship with an original NC in the first NC group; instruct the at least one CPU to modify a route configuration, so as to modify a port that is in a route register and that accesses a CPU in another domain, to a port that performs cross-domain access by using the target NC; and initiate cancellation of system silence.

In a first possible implementation manner of the third aspect, a detailed NC adding technology is provided.

In a second possible implementation manner of the third aspect, the main CPU being configured to control at least one CPU that is in the first QPI domain and that performs cross-domain access by using the second NC group, to switch, by modifying a route configuration, to perform cross-domain access by using the target NC specifically includes: the main CPU being configured to: send an instruction to the at least one CPU that performs cross-domain access by using the second NC group, and instruct the at least one CPU to set data states corresponding to M cross-domain sink CPUs in recorded data states to an invalid state, where the data states recorded by the CPU correspond to a total of N cross-domain sink CPUs, and M<N; initiate system silence to configure all CPUs in the multi-CPU system to a silent state; and instruct the at least one CPU to modify a route configuration, so as to configure a port that is in a route register and that accesses the M CPUs, to a port that performs cross-domain access by using the target NC.

In a second possible implementation manner of the third aspect, a detailed NC adding technology is provided to change routes of different sink nodes.

The present disclosure further provides a computer, where the computer includes the first QPI domain, the second QPI domain, the first NC group, and the second NC group, and the computer further includes a BIOS, where the BIOS is used to store instructions required for running of the CPUs in all the foregoing aspects, and the computer brings technical effects similar to the foregoing aspects.

The present disclosure further provides a multi-CPU system management method, which is applicable to the main CPU in all the foregoing aspects or the foregoing computer and brings similar technical effects.

DESCRIPTION OF EMBODIMENTS

Figure 1:
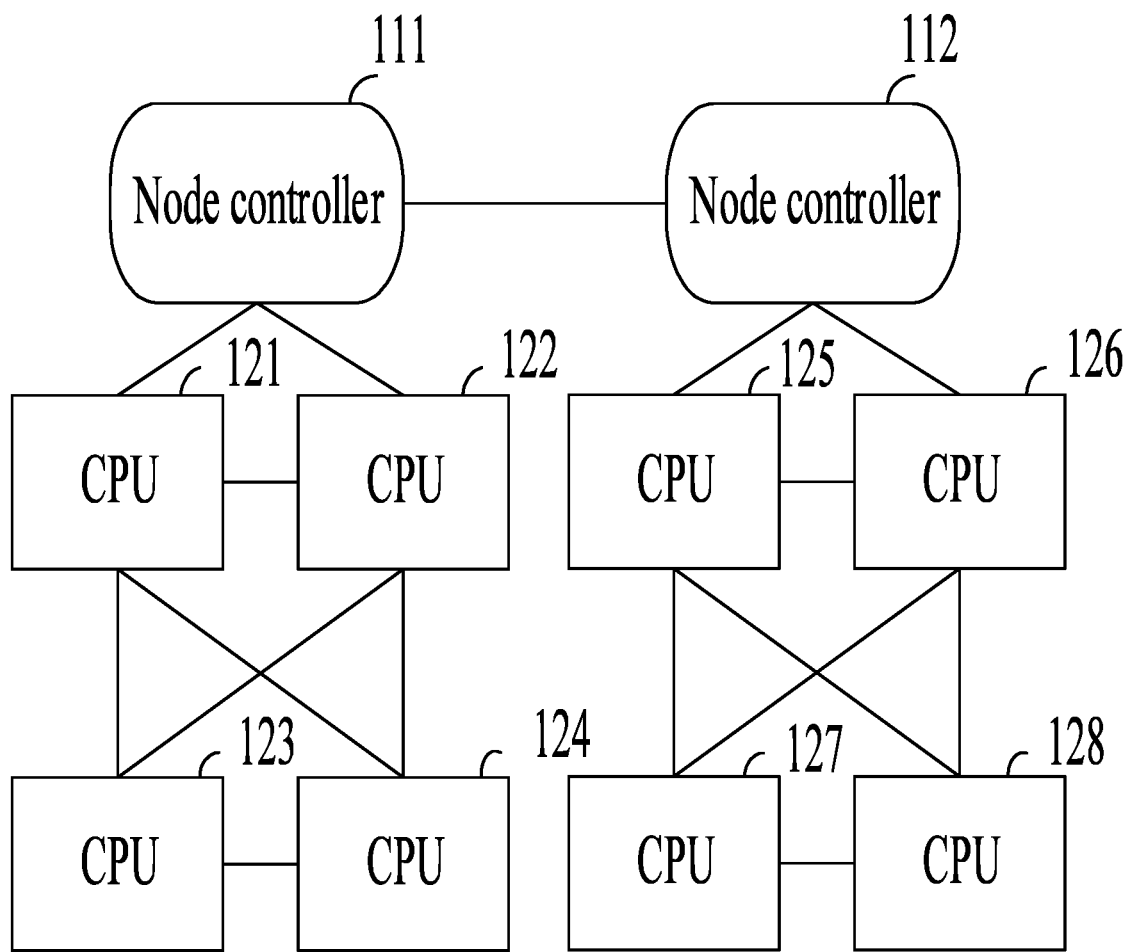
FIG. 1 is an architectural diagram of a multi-CPU system in the prior art.

The following clearly describes the technical solutions in the embodiments of the present disclosure with reference to the accompanying drawings in the embodiments of the present disclosure. Apparently, the described embodiments are merely some but not all of the embodiments of the present disclosure.

A multi-CPU system such as an NUMA is located in a computer. In a multi-CPU system, by relying on only direct connections between CPUs, the scale of the system is hardly expansible because a quantity of external interfaces of the CPUs is limited. To form a CPU system of more CPUs, different CPU groups are generally connected by using an NC, and data is transmitted between the CPU groups by using the NC.

The NC group is also called an NC plane, and consists of one or more NCs. Multiple NCs in a same NC group may be interconnected in a manner of full mesh (full mesh), ring connection or serial connection. The CPU group is also called a QPI domain, and the QPI domain consists of one or more CPUs. Multiple CPUs in a same QPI domain are connected by using a QPI bus. The NC group is connected to the CPU group.

The CPUs in a CPU group are not only interconnected by using the QPI bus, but also may be interconnected by using another cache coherency (Cache Coherency, CC) bus, for example, a hyper-transport (Hyper-Transport, HT) bus. Therefore, a CPU group may also be called a cache coherency domain. For ease of description, the embodiments of the present disclosure are described by using a QPI domain as an example.

In the embodiments, one port of the CPU is connected to the NC, and remaining ports are connected to other CPUs in the domain. The NC group may forward a packet between QPI domains, and therefore, CPUs in different QPI domains may implement packet transmission by using the NC group.

Optionally, each CPU has multiple ports, where one of the ports is connected to the NC, and remaining ports are connected to CPUs in the current QPI domain. For example, a CPU has 3 ports, one of the ports is connected to the NC, and remaining two ports are connected to adjacent CPUs. A connection line between a CPU and an NC is also a connection line between the CPU and an NC group. The NC group provides a forwarding function, and the CPU communicates with CPUs in other QPI domains by using a line connected to the NC group.

In a process of using the NC, reliability may decrease and even a fault may occur. If the NC is faulty, specific impact may be caused onto bandwidth of accessing a CPU in the multi-CPU system. To improve reliability of the multi-CPU system, an ideal multi-CPU system should support NC hot-swap. A running state of the multi-CPU system is monitored by using management software. If the running of an NC is found unstable, for example, frequency or a quantity of times of fault occurrence of the NC in a time period exceeds a threshold, the NC is marked risky. Further, before the NC becomes unavailable, the risky NC is replaced by hot-removing the risky NC and then hot-adding a new NC, so as to prevent critical impact caused by abrupt failure of the NC onto the system.

Hot-swap refers to swap without breaking power, and allows a user to replace a related part without turning off the system and without cutting off a power supply. Specifically, hot-swap includes two processes: hot removing and hot adding.

In this embodiment of the present disclosure, multiple QPI domains are connected to the same multiple NC groups. A route configuration is stored in the NC and a CPU register, and a packet transmission path may be changed by modifying the route configuration. In a mutual access operation between CPUs, a transaction is used to describe a series of access operations. A CPU that initiates an access transaction (sends an access request) is called a source CPU, and a CPU that responds to the transaction (responds to the access request) is called a sink CPU. In a transaction processing process, a channel for transmitting data between the source CPU and the sink CPU is called a route. A transmission direction of a data packet is opposite to a transaction route direction, where the sink CPU is a sender of the data packet, and the source CPU is a receiver of the data packet. A transmission direction of a request packet is the same as the transaction route direction, where the source CPU sends a data request packet, and the sink CPU responds to the data request packet.

Figure 2:
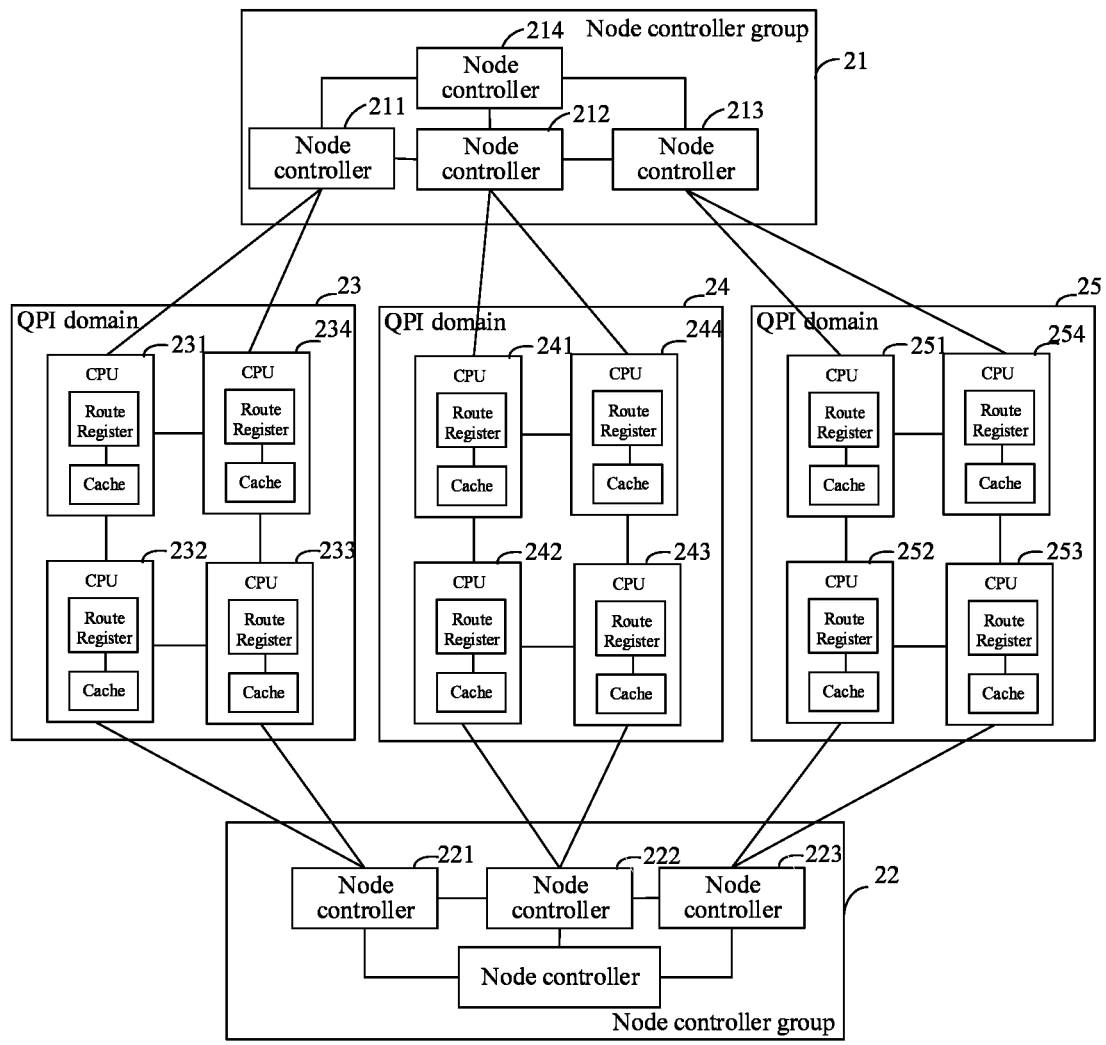
FIG. 2 is an architectural diagram of an embodiment of a multi-CPU system according to the present disclosure.

FIG. 2 is an architectural diagram according to an embodiment of the present disclosure. A QPI domain 23, a QPI domain 24, and a QPI domain 25 are all connected to an NC group 21 and an NC group 22. Any CPU may access CPUs in other QPI domains by using the NC group 21 or the NC group 22. A same CPU may also access different CPUs in other domains by using different NC groups. Access mentioned in this embodiment of the present disclosure may be, for example, reading data from other CPUs in the form of a packet. Specifically, data is read from a memory managed by other CPUs.

In a multi-CPU system, one CPU serves as a main CPU. The main CPU manages and controls the NC and other CPUs, and the main CPU may be located in any QPI domain. The main CPU generates a management and control instruction by running a program. The program may be acquired from a BIOS of a computer. The BIOS is connected to the multi-CPU system, and both the multi-CPU system and the BIOS are integral parts in the computer.

That is, the CPUs in a QPI domain may access each other without using an NC. For example, in FIG. 2, if a CPU 231 needs to access a CPU 234, there are multiple optional routes, including: CPU 231-CPU 232-CPU 233-CPU 234, CPU 231-CPU 234, and CPU 231-NC 211-CPU 234. However, CPUs in different QPI domains need to access each other by using an NC group. If the CPU 231 accesses a CPU 241, an optional access path is CPU 231-NC 211-NC 212-CPU 241, or the following access path may be selected: CPU 231-CPU 232-NC 221-NC 222-CPU 242-CPU 241. The former passes through the NC group 21, and the latter passes through the NC group 22.

In an embodiment of the present disclosure, a multi-CPU system includes: at least two Quick-Path Interconnect QPI domains, a first NC group, and a second NC group. Each QPI domain includes at least one CPU, and each NC group includes at least one NC. Each NC is connected to all QPI domains.

In the multi-CPU system, a CPU may send an access request to the first NC group according to a route configuration of the CPU when accessing a first sink CPU in another QPI domain, where the first NC group is used to forward the access request to the first sink CPU in a second QPI domain. Still, a CPU may send an access request to the first NC group according to a route configuration of the CPU when accessing a second sink CPU in another QPI domain, where the first NC group is used to forward the access request to the second sink CPU in a second QPI domain.

The CPU that accesses the first sink CPU by using the first NC group may be the same as or different from the CPU that accesses the second sink CPU by using the second NC group.

The following briefly describes a change caused by NC removing and adding onto the system when communication is performed between CPUs that belong to different QPI domains.

For example, this embodiment of the present disclosure provides two solutions when an NC 211 in the NC group 21 needs to be removed. Both manners are performed under control of the main CPU. One manner is to switch all routes that originally pass through the NC group 21 to the NC group 22, and the other manner is to switch routes that originally pass through the NC 211 to the NC group 22 and routes that pass through other NCs in the NC group 21 keep unchanged.

Similarly, there are also several solutions when an NC needs to be added under control of the main CPU, for example, after an original NC 211 is removed, a new NC 211 is added into the NC group 21. One manner is: Depending on different source CPUs that initiate cross-domain access, the main CPU selects some of the routes that pass through the NC group 22, and switches the selected routes to the NC group 21, and remaining routes keep unchanged. Another manner is: Depending on different sink CPUs accessed between domains, the main CPU selects routes corresponding to some sink CPUs from the routes that originally pass through the NC group 22, and switches the selected routes to the NC group 21, and remaining routes keep unchanged. Still another manner is to switch, to the NC group 21, all routes that pass through the NC group 22.

Cross-domain access means that an accessed CPU and a CPU that sends an access request are not in a same QPI domain, and specifically, an accessed memory address is a memory address managed by a CPU in another QPI domain. The access request is used by one CPU to request data from another CPU. It should be noted that, if an access request of cross-domain access passes through any NC in an NC group, the cross-domain access is considered as passing through the NC group. That a CPU performs cross-domain access by using one NC group (or NC), means that in the route configuration of the CPU, the NC group or NC is directly or indirectly pointed to. It does not necessarily mean that cross-domain access exists at a current time point. However, when the CPU sends a cross-domain access request, the access request may pass through the NC group or NC.

Directly pointing to an NC is, for example, directly connecting to the NC that is pointed to. In the CPU route configuration, a next node is the NC that is pointed to. When the CPU sends a cross-domain access request, according to the CPU route configuration, a next node that the cross-domain access request passes through is the NC that is pointed to. Indirectly pointing to an NC is, for example, passing through another node (such as an NC or a CPU) first and then connecting to the NC that is pointed to. When the CPU sends a cross-domain access request, according to the CPU route configuration, the cross-domain access request may pass through other nodes first and then arrive at the NC that is pointed to. The foregoing describes principles of directly or indirectly pointing to an NC, and principles of directly or indirectly pointing to an NC group are the same.

Embodiment 1

Figure 3:
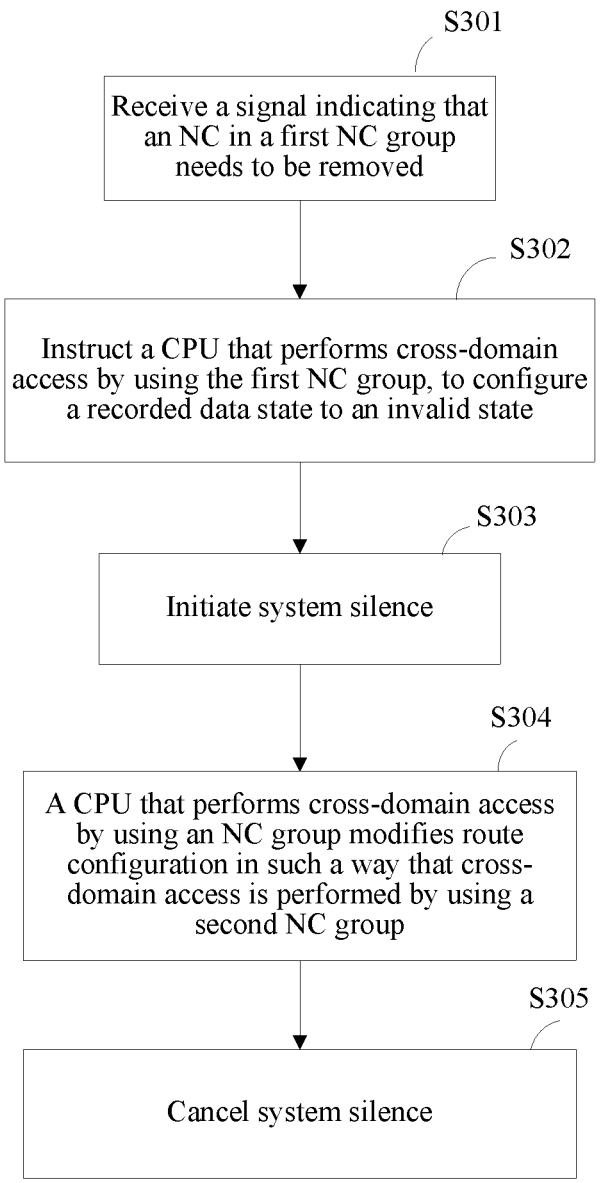
FIG. 3 is a flowchart of an NC removing method embodiment according to the present disclosure.

Referring to FIG. 3, this embodiment of the present disclosure provides an NC hot-remove method. This method is described based on the architecture in FIG. 2.

When an NC in the first NC group is to be removed, a main CPU controls all CPUs in the multi-CPU system that perform cross-domain access by using the first NC group, to switch to perform cross-domain access by using a second NC group.

Assuming that the main CPU is a CPU 234 in a QPI domain 23, and an NC to be removed is an NC 211. For ease of description, the to-be-removed NC 211 in this embodi- ment is called a target NC, the NC group 21 is called a first NC group, and the NC group 22 is called a second NC group.

S301. A main CPU receives a signal indicating that an NC in a first NC group needs to be removed.

Exemplarily, when a user is ready to remove the NC 211, the user may send a remove instruction to the main CPU 234 by using an operating system, where the remove instruction includes an identifier of the NC 211. In this way, when receiving the remove instruction, the main CPU 234 may determine that an NC to be removed exists in the NC group 21.

Exemplarily, after detecting that reliability of the NC 211 in the NC group 21 is reduced, the CPU 234 may start removing the NC 211. After a route that passes through the NC group 21 is switched to an NC group 22 and use of the NC group 21 is stopped, the NC 211 may be hot-removed.

S302. The main CPU instructs a CPU that performs cross-domain access by using the first NC group, to configure a data state recorded by the CPU to an invalid state.

The main CPU may learn a topological relationship between CPUs in a multi-CPU system, or in other words, the main CPU knows connection relationships between different ports of each CPU and other devices (an NC or a CPU). Therefore, by reading outbound port information in a CPU route configuration, the main CPU may learn whether an NC group used by the CPU for cross-domain access is the first NC group. Accordingly, if the main CPU instructs another CPU to modify an outbound port in a route configuration, a path used by the CPU for external access can be changed (referring to a subsequent step S304). The route configuration is recorded in a cache of the CPU.

For example, the main CPU records that: if the CPU 231 needs to access a CPU (for example, a CPU 241) in another domain by using the NC group 21, a port that needs to be used is a port connected to the NC 211 among 3 ports of the CPU 231; if the CPU 231 needs to access a CPU (for example, a CPU 241) in another domain by using the NC group 22, a port that needs to be used is a port point to the NC 221 among 3 ports of the CPU 231, that is, a port between the CPU 231 and the CPU 232. If the port currently configured by the CPU 231 for accessing another domain is the former, it means that the CPU 231 performs cross-domain access by using the first NC group. According to this method, all CPUs in the multi-CPU system that perform cross-domain access by using the first NC group may be obtained.

For example, the main CPU may record, in the cache, outbound ports used by each CPU for accessing different memory addresses. After reading the cache of the main CPU, the main CPU can learn which CPUs use the first NC group to perform cross-domain access. Alternatively, an independent management device may record such information and provide the information for the main CPU.

Using FIG. 2 as an example, when the CPU 231 accesses a memory address that is not in a domain of the CPU 231, the port that is connected to the NC 211 and that is in the CPU 231 is used. The CPU includes a core, a cache agent (Cache Agent, CA), and a home agent (Home Agent, HA). The CA manages the cache, and the HA manages a memory. When requiring data, a CPU core first uses a CA of the CPU core to search a cache managed by the CA, and if the data is not found, uses an HA to search a memory managed by the HA.

The HA that provides data and the core that sends an access request may be located in a same CPU or in different CPUs. This embodiment describes an HA that provides data, and emphasizes an HA located in another QPI domain.

In this embodiment of the present disclosure, a data state of the CPU refers to a state of data that is in a CPU cache and that has been acquired by the CPU. The data state is recorded in the CPU cache and is managed by the CA.

If the CPU has ever accessed data of another CPU (specifically, the data may be data in a memory managed by an HA of the another CPU), the CPU that initiates access may record a current state of the acquired data. In a specific packet transmission process, a source CPU initiates access, and a sink CPU provides a packet. Specifically, the sink CPU obtains data from a memory by using an HA of the sink CPU, and then provides the data for the source CPU. The data state recorded by the CPU is the state of the data (such as a packet) that is obtained by the CPU when the CPU serves as a source CPU, and the data state corresponds to the sink CPU access to which is requested. According to a cache coherency protocol (cache coherency protocol), after obtaining desired data, the source CPU of the access request records the state of the obtained data in its own cache. States include: an exclusive (Exclusive, E) state, an invalid (Invalid, I) state, a shared (Share, S) state, and a modified (Modify, M) state. These states are marked in a memory address (cache line). The memory address may further record an address of data in the memory.

The M state indicates that data marked in the memory address has been modified (dirty) by the source CPU and is inconsistent with original data provided by the sink CPU. After the modified data is written back into the memory, the state in the memory address may change to the E state. The E state indicates that data marked in the memory address has not been modified (clean) and is consistent with the data in the memory. The S state means that data marked in the memory address may be buffered by multiple CPUs, and the data in all the caches is consistent with the data in the memory. The I state indicates that the data is invalid, for example, another CPU may have modified the data marked in the memory address.

The NC may also record data states. When the CPU transmits a cross-domain packet and when the cross-domain packet passes through the NC, the NC records a data state, so that the data state recorded by the NC keeps consistent with a data state recorded by the source CPU of the packet. In subsequent cross-domain access, another CPU may learn the data state of the CPU by using the NC, which is faster compared with the practice of obtaining the data state from the CPU.

In this embodiment, a route configuration of all CPUs that have accessed other domains by using the NC group 21 needs to be modified to point to the NC group 22 rather than the NC group 21. Because such CPUs have not served as a source CPU to receive a packet by using the NC group 22, no corresponding data state is recorded in the NC. That is, in the state record of the NC, the corresponding data state is the I state. By modifying the state recorded in the CPUs that send packets by using the NC group 21, to the I state, the data states can be kept consistent between the NC and the CPUs.

An optional implementation manner of configuring the data state recorded by the CPUs that perform cross-domain access by using the first NC group, to the invalid state includes two parts. The first part is: The main CPU instructs the CPUs to flush data buffered by the CPUs, so that the data state M state in the CPUs changes to the I state, where the cache clearing may specifically refer to returning the buffered data to a memory that provides the data. The second part is: The main CPU instructs an NC in the first NC group to flush a data state recorded by the NC, so that both the S state and the E state recorded in the NC change to the I state, and the S state and the E state of the CPU also change to the I state accordingly. The two parts of operations are initiated by the main CPU by using instructions. The following provides specific interpretation.

The first part: A CPU core executes a flush cache command, and accordingly, writes data in the modified state recorded in the CPU into the memory, and then changes the data state from modified to invalid. In addition, in a process of writing the data into the memory, the data may pass through the NC in the first NC group. The NC in the first NC group also changes a corresponding directory state recorded by a directory cache of the NC from modified to invalid, which keeps consistent with a directory state of accessed data recorded in the CPU.

The second part is: (1) The NC of the first NC group queries the data state in the cache of the NC (when CPUs access each other by using the NC, the NC records the state of the accessed data), obtain records currently in the S state and the E state, and send a snoop message to the CPUs that have the S-state or E-state records. (2) A CPU that receives the snoop message downgrades the S-state and E-state records to the I state, and then sends a response message to the NC. After receiving the response message, the NC also downgrades the S state and the E state recorded by the NC, to the I state. The CPU that receives the snoop message is a CPU that has ever accessed a CPU in another QPI domain by using the first NC group.

S303. The main CPU initiates system silence.

It should be noted that NC hot-swap not only relates to data continuity or interruption on a bus, but also affects a working mode and capabilities of the entire multi-CPU system. Therefore, removing the NC when the multi-CPU system is in a silent state can avoid CPU service errors caused by the NC removal. When the multi-CPU system is in the silent state, all CPUs suspend accessing the memory and input/output interface resources; prefetch, interrupt and the like that are initiated from an input/output interface are disabled, and an instruction pointer of the CPU is limited in a software cycle.

If the main CPU has multiple cores, the system silence range is all CPUs that include the main CPU. The main CPU may leave one or more cores not to get silent, and remaining cores get silent. All cores of other CPUs get silent. The core not in the silent state in the main CPU is used to perform subsequent operations.

If the main CPU has a single core, system silence means that the main CPU does not get silent but all cores of other CPUs get silent. Because it is a seldom case that the main CPU has a single core, a scenario in which the main CPU has multiple cores is used as an example for the following description.

The CPU 234 may make a core that needs to be silent get silent. Other CPUs may get silent in multiple manners. An optional manner is: The CPU 234 directly modifies a silence register of other CPUs, and the CPUs whose silence registers are modified become silent. Another optional manner is: The CPU 234 broadcasts a silence packet in the entire multi-CPU system, and a CPU that receives the packet starts a silence operation and sets the CPU itself to a silent state. The following gives detailed description using the latter manner as an example.

A silence command comes in two types. One type is: The silence command may directly modify a configuration of the silence registers of other CPUs, and the CPUs whose silence registers are configured to silence enter the silent state. Another type is: The silence command is an instruction sent to cores of other CPUs, and a core of a CPU that receives the instruction starts a silence program so that the CPU gets silent.

For the CPU 231, CPU 232, and CPU 233 that are in the same QPI domain as the CPU 234, the CPU 234 transmits a silence packet by using a QPI bus that is between CPUs in a domain. The CPU 231 and CPU 233 may directly receive the silence packet of the CPU 234, and the CPU 232 may receive the silence packet forwarded by the CPU 231 or the CPU 233.

For CPUs that are not in a same QPI domain as the CPU 234, for example, CPUs in a QPI domain 24 and a QPI domain 25, the CPU 234 sends a silence packet to the NC group, and the NC group transmits the silence packet to the QPI domain 24 and the QPI domain 25. A CPU that receives the silence packet forwards the silence packet in the domain, and finally all CPUs receive the silence packet.

For example, the CPU 234 sends a silence packet to the CPU 241 by using the NC 211 and the NC 212. The CPU 241 continues sending the silence packet by using a QPI bus that is between the CPUs, so that all CPUs in the QPI domain 24 receive the silence packet. The NC 212 further sends the silence packet to the NC 213, and the NC 213 sends the silence packet to the CPU 251. The CPU 251 continues sending the silence packet by using the QPI bus that is between the CPUs, so that all CPUs in the QPI domain 25 receive the silence packet.

S304. The main CPU instructs all CPUs that perform cross-domain access by using the first NC group, to modify a route configuration, so that all the CPUs that perform cross-domain access by using the first NC group, switch to perform cross-domain access by using a second NC group.

A route register of a CPU may record route information, where the route information may be a correspondence between a memory address and a CPU port. A route register of an NC also records route information, where the route information may be a correspondence between a memory address and an NC port. Both the CPU and the NC send request packets according to a port recorded in the route information, so that the request packet is sent along a route. By modifying route information in a route register of a node that the route passes through, an entire transmission path of an access request can be changed. The route register may be integrated in a cache of a CPU.

If switching needs to be performed in such a way that a CPU that transmits a packet by using the second NC group is directly connected to an NC in the second NC group, the switching refers to configuring the port used by the CPU for cross-domain access, to a port directly connected to the NC in the second NC group; or, if switching needs to be performed so that no direct connection but another CPU exists between a CPU that transmits a packet by using the second NC group and an NC in the second NC group, the switching refers to configuring the port used by the CPU for cross-domain access, to a port connected to the another CPU. After receiving the access request, the another CPU may forward the access request to the NC in the second NC group.

Exemplarily, accessing the CPU 241 by the CPU 231 is cross-domain access, and it is assumed that an originally configured access port is a port connected to the NC 211 among ports of the CPU 231. After a route register is modified, in a new route configuration, the port changes to a port connected to the CPU 232 among the ports of the CPU 231. After the access arrives at the CPU 232, in a route configuration of the CPU 232, the port used for accessing the CPU 241 is the port between the CPU 232 and the NC 221.

Therefore, the CPU 232 may forward the access to the NC 221, and the NC 221 continues forwarding the access, so that the access can arrive at the CPU 241. An entire access path is CPU 231-CPU 232-CPU 233-NC 221-CPU 242-CPU 241. It should be noted that the main CPU 231 chooses to forward the access request of the CPU 231 to the CPU 232 rather than to the CPU 234 because the main CPU records a topological relationship between CPUs in the multi-CPU system and outbound port configuration of each CPU. Therefore, it can be learned that, by using the CPU 232, the cross-domain access can be performed relatively directly by using the NC group 22, and then the CPU 231 is instructed to configure a route port to the port corresponding to the CPU 232.

Certainly, depending on different policies, in another embodiment, the main CPU 231 may also choose to let the CPU 231 forward the access request to the CPU 234, the CPU 234 forwards the access request to the CPU 233, and then the CPU 233 forwards the access request to the NC 221.

It is assumed that the CPU 234 accesses the CPU 252, and it is assumed that an originally configured port is a port between the CPU 234 and the NC 211. After the route register is modified, in the new configuration, the port changes to the port between the CPU 234 and the NC 221.

It can be seen that ports of the CPU (for example, one CPU may have 3 ports or more) are connected to different next nodes (for example, the nodes are NCs or CPUs) respectively. After receiving the access request sent from the port of the CPU, another node continues forwarding until the access request arrives at a sink CPU to be accessed. In a process of being forwarded, the access request sent from a port of the CPU may pass through the second NC group, and this port is the port that performs cross-domain access by using the second NC group. Therefore, in the route register, the port used to access a CPU in another domain may be configured to a port that performs cross-domain access by using the second NC group, where the CPU in the another domain may be marked with a memory address managed by the CPU.

After step S304, the NC can be removed.

S305. The main CPU cancels system silence after finishing modifying the route configuration.

Steps of canceling silence are similar to the silence process, and include the following steps: The CPU 234 cancels the silent state of silent cores of the CPU; and the CPU modifies, by using a silence cancellation command, configurations of other CPUs to cancel the silence state of the other CPUs. For other CPUs in the QPI domain 23, the silence cancellation command may be directly sent by the CPU 234 without being forwarded by the NC; for CPUs in other QPI domains, the silence cancellation command sent by the CPU 234 may be forwarded by the NC 22. A process of canceling system silence by the main CPU is similar to the process of initiating system silence, and reference may be made to step S303. A difference is that a silence command may be transmitted by the NC group 21, but a silence cancellation command can be transmitted by only the NC group 22.

A silence cancellation command comes in two types. One type is: The silence cancellation command may directly modify state-related register configurations of other CPUs, and the CPUs whose register configurations are modified cancel the silent state. The other type is: The silence cancellation command is an instruction sent to cores of other CPUs, and a core of a CPU that receives the instruction starts a silence program so that the CPU cancels silence.

After the system silence is canceled, each CPU restores normal running. In this case, due to route modification, all CPUs in the multi-CPU system pass through the NC group 22 and no longer use the NC group 21 when subsequently receiving or transmitting a packet between QPI domains. It is ensured that, after the NC 211 in the NC group 21 is removed, the CPU that originally receives and transmits a cross-domain packet by using the NC group 21 can continue receiving and transmitting a packet between QPI domains. That is, the foregoing method implements hot removal of the NC in the multi-CPU system.

Embodiment 2

Figure 4:
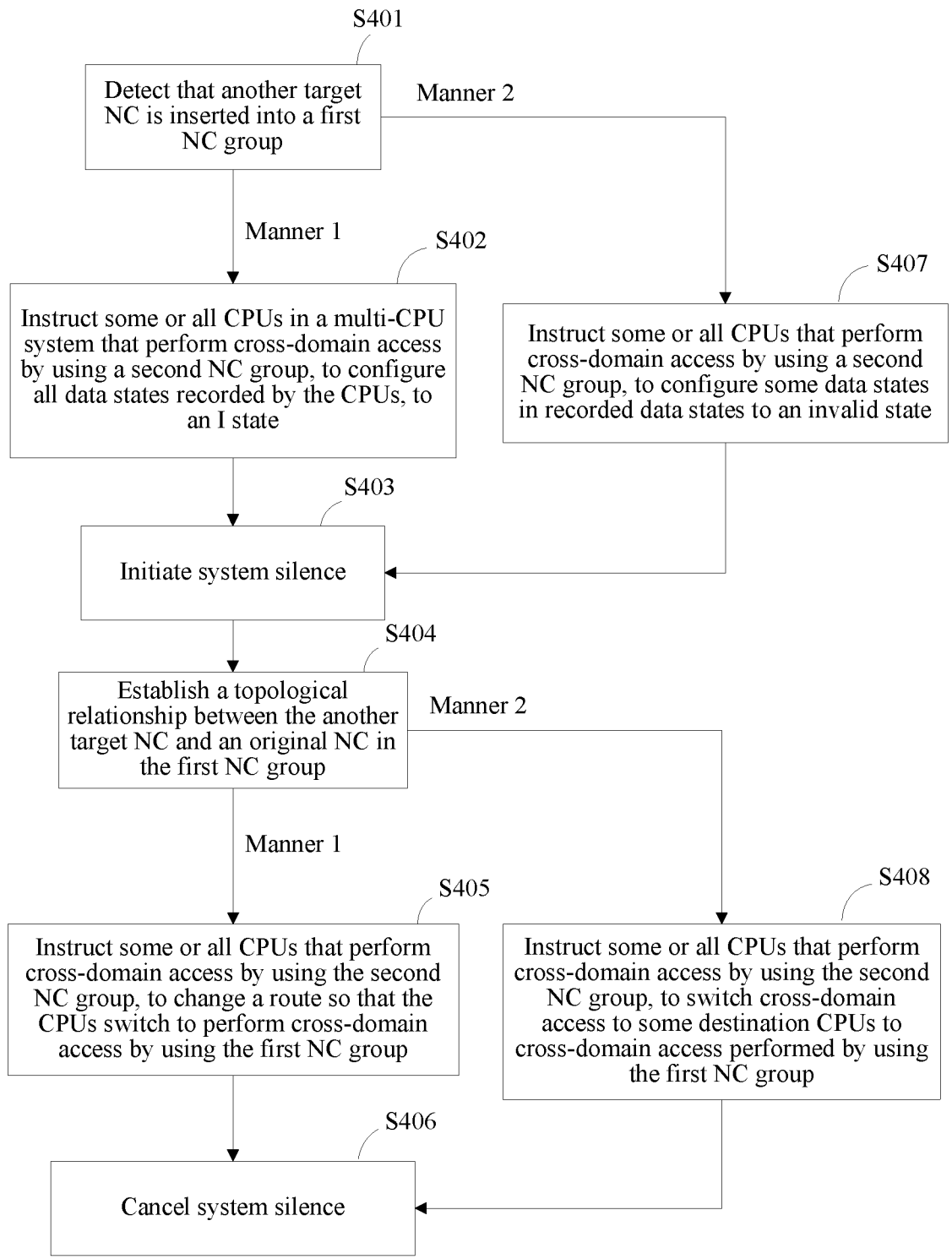
FIG. 4 is a flowchart of an NC adding method embodiment according to the present disclosure.

Referring to FIG. 4, the following describes a process of adding an NC into an existing NC group. Still using the system architecture in FIG. 2 as an example, the CPU 234 is a main CPU. A new NC 211 added into the NC group 21 is called another target NC in this embodiment in order to be differentiated from the removed NC 211 in Embodiment 1. This embodiment may be performed after Embodiment 1, and is equivalent to replacing the NC 211. Unless specially specified, related description in Embodiment 1 is still applicable in this embodiment.

This embodiment may be used to: after another target NC is added to a first NC group, reuse the first NC group, that is, control at least one CPU, which is located in a multi-CPU system and performs cross-domain access by using a second NC group, to switch to perform cross-domain access by using the first NC group.

Step S401: A main CPU detects that another target NC is added to a first NC group.

Exemplarily, a multi-CPU system periodically detects a state of each slot, where the slot is used for inserting an NC, and the state of the slot is used to indicate whether an NC exists in the slot. In this way, when a new NC is added to the slot, the state may change, and the main CPU can detect insertion of the new NC.

The foregoing description is merely exemplary. The present disclosure does not limit how the main CPU detects connection of the another target NC to the first NC group. For example, in this embodiment of the present disclosure, a user may use a button to trigger the main CPU to detect the state of each slot.

S402. The main CPU sends an instruction to at least one CPU that performs cross-domain access by using a second NC group, so as to instruct the CPU to configure a data state recorded by the CPU to an I state.

In this step, the CPU that needs to be configured to the I state is a CPU ready to perform route switching in a subsequent step. An operation of configuring the data state to an I state includes: flushing a cache of a CPU that needs to be configured to the I state; and configuring, by an NC through which the CPU that needs to be configured to the I state passes, a related S state and E state of the CPU to the I state, so that the S state and E state of the CPU change to the I state accordingly. For a detailed process, reference may be made to step S302.

There may be different policies for selecting CPUs to be switched to the first NC group. The selection may be made according to performance of two NC groups or a quantity of nodes passed through when access is performed between CPUs.

S403. The main CPU initiates system silence.

For a system silence process, reference may be made to step S303. A difference from step S303 is: Silence information in step S303 may be propagated between domains by using the NC group 21 or propagated between domains by using the NC group 22; in step S403, however, the NC group 21 does not work, and the silence information can be propagated between domains by using only the NC group 22.

S404. Activate the another target NC to establish a topological relationship between the another target NC and an original NC in the first NC group.

By configuring a route register, a forwarding relationship is established between the another target NC and at least one original NC in the first NC group. If the first NC group uses a full-interconnect structure, the established forwarding relationship is a forwarding relationship between the another target NC and all NCs in the first NC group. In this way, data received by the another target NC may be forwarded to other NCs, and other NCs may forward the data to the another target NC.

S405. The main CPU uses an instruction to control the at least one CPU that performs cross-domain access by using the second NC group, to change a route in such a way that cross-domain access is performed by using the first NC group.

Specifically, a route register configuration of the at least one CPU that performs cross-domain access by using the second NC group is modified, where the at least one CPU includes the CPU that configures the data state to the I state in step 402, and also includes a CPU originally in the I state. A port that is recorded in the route register and that accesses a CPU in another domain is modified to a port that performs cross-domain access by using the first NC group.

In the at least one CPU that performs cross-domain access by using the second NC group, the data state is already configured to the I state in step S402, and therefore, route information may be modified in this step.

For this step, reference may be made to step 304, and no details are given herein.

It should be noted that a specific route to be switched to the first NC group may be changed according to a policy, and is not limited by this embodiment of the present disclosure. For example, a quantity of routes that pass through two NC groups may be allocated proportionally according to performance of the two NC groups, or, a path that traverses a relatively small quantity of CPUs/NCs is selected and configured as a route according to the quantity of CPUs/NCs traversed between two endpoints of a route.

Exemplarily, the CPU 231 accesses the CPU 241. According to an original route configuration of the CPU 231, a next node is the CPU 232, and an entire access path may be CPU 231-CPU 232-NC 221-NC 222-CPU 242-CPU 241. After a route register is modified, the next node in the route register is configured to the NC211, and a new route is CPU 231-NC 211-NC 212-CPU 241. For another example, the CPU 234 accesses the CPU 252. It is assumed that in an original route configuration of the CPU 234, a next node is the CPU 233, and an entire access path may be CPU 234-CPU 233-NC 221-NC 222-NC 223-CPU 252. After a route register is modified, the next node in the route register is configured to the NC 211, and the entire access path may change to CPU 234-NC 211-NC 212-NC 213-CPU 251-CPU 252.

In this step, an optional manner is: Among the CPUs that perform cross-domain access by using the second NC group, a CPU directly connected to the first NC group switches to perform cross-domain access by using the first NC group.

S406. After the route is modified, the main CPU cancels system silence.

The CPU 234 cancels the silent state of silent cores of the CPU, and the CPU 234 modifies, by using a silence cancellation command, configurations of other CPUs to cancel the silent state of the other CPUs. For a detailed process of canceling silence, refer to S305. After system silence of the multi-CPU system is canceled, each CPU restores normal running, and the another target NC is added.

The foregoing steps implement that at least one CPU that performs cross-domain access by using the second NC group, switches to perform cross-domain access by using the first NC group.

An embodiment of the present disclosure further provides a route switching method. Among at least one CPU that performs cross-domain access by using the second NC group, depending on different sink CPUs that are accessed between domains, cross-domain access to some sink CPUs is switched to cross-domain access performed by using the first NC group, and cross-domain access to other sink CPUs is still performed by using the second NC group. The following gives detailed description.

In step S402 in this embodiment, all data states recorded in a route register of a CPU may be configured to an I state. Data depicted by the data states that need to be configured to the I state may come from different CPUs. Therefore, this step may be improved as follows: Data states are grouped depending on different data sources, data states of data that comes from some CPUs are configured to the I state, and corresponding states of data that comes from other CPUs keep unchanged.

That is, step S402 may be replaced with S407.

S407. The main CPU sends an instruction to the at least one CPU that performs cross-domain access by using the second NC group, and the CPU that receives the instruction configures some of the recorded data states to an invalid state. The data states configured to the invalid state according to the instruction may be data states corresponding to some sink CPUs that have been accessed by the main CPU. In other words, for a single CPU, data states recorded by the CPU include data states of data that comes from N cross-domain sink CPUs. In this step, data states of data that comes from M cross-domain sink CPUs among the N cross-domain sink CPUs are configured to the invalid state, where M<N. The accessed sink CPU and the CPU that initiates access are in different QPI domains. Therefore, the accessed sink CPU is briefly called a cross-domain sink CPU.

Specifically, after obtaining the accessed data, the CPU may record the data states of the accessed data into the cache of the CPU. Assuming that a quantity of accessed cross-domain sink CPUs is N, the CPU records the data states of the data that comes from the N CPUs. In this step, the data states of the data that comes from the M cross-domain sink CPUs among the N CPUs are configured to the invalid state, where M<N, and both M and N are natural numbers. The data states of the data of remaining N-M CPUs keep unchanged.

Optionally, the M CPUs are directly connected to the first NC group. After the route switching in step S408 is performed, cross-domain access to the M CPUs may be performed without forwarding by other CPUs.

The data state recorded in the CPU is the data state of the data accessed by the CPU. The data state corresponds to the data buffered in the CPU, and corresponds to the memory address from which the data comes. The memory address from which the data comes corresponds to the CPU that manages the memory address. Therefore, the data state may correspond to the CPU (sink CPU) that provides the data.

For ease of understanding, further interpretation is given herein: Among the at least one CPU that performs cross-domain access by using the second NC group, the data state recorded in each CPU is the data state of the data that has ever been accessed by the CPU, and the data that has ever been accessed by the CPU may come from other CPUs, where the CPUs may also called accessed CPUs or sink CPUs. Among the sink CPUs, a total of N CPUs are in a QPI domain different from that of a CPU that initiates access (source CPU). In this embodiment, the data states of only M sink CPUs among the N CPUs are configured to the invalid state. Accordingly, in a subsequent step, route switching is performed on the M CPUs.

Multiple algorithms are available for selecting CPUs that the data states of the data come from. For example, according to a quantity of CPU nodes traversed between the source CPU and the sink CPU of an access transaction, if a relatively small quantity of other CPUs are traversed when the source CPU accesses the sink CPU by using the first NC group, the route is switched to the first NC group; otherwise, the second NC group is still in use.

For example, in the architecture shown in FIG. 2, the CPU 231 records a data state corresponding to the CPU 241 and a data state corresponding to the CPU 242. According to step S402, all data states of the CPU 231 are configured to the I state; and according to step S407, only the data state that corresponds to the CPU 241 and that is in the CPU 231 may be configured to the I state, and the data state corresponding to the CPU 242 keeps unchanged.

If step S402 is replaced with S407, step S405 needs to be replaced with S408.

S408. The main CPU instructs the at least one CPU that performs cross-domain access by using the second NC group, to switch cross-domain access to some cross-domain sink CPUs to cross-domain access performed by using the first NC group. That is, cross-domain access to the M CPUs corresponding to the data states configured to the I state in step S407 is switched to cross-domain access performed by using the first NC group. Specifically, the port for cross-domain access in the route registers of the CPUs is configured to the port connected to the target NC in the CPU. Access to the cross-domain sink CPUs corresponding to remaining data states may keep unchanged.

Still using the example given in step S406, accessing the CPU 241 by the CPU 231 may be switched to the access performed by using the first NC group, and accessing the CPU 242 by the CPU 231 still uses the second NC group.

In an embodiment (manner 2 in FIG. 4) formed by steps S401, S407, S403, S408, and S405, route management is more refined and efficiency of cross-domain CPU access performed by using a route can be improved compared with an embodiment (manner 1 in FIG. 4) formed by steps S401, S402, S403, S404, and S405.

Embodiment 1 and Embodiment 2 have described an NC hot removing process and an NC hot adding process respectively. If combined together, the two processes are an NC hot-swap process. They may also be used separately as two independent processes. A single NC or multiple NCs may be hot added or hot removed concurrently.

Embodiment 3

In Embodiment 1, after a target NC is removed, an entire NC group in which the target NC is located no longer forwards data. This practice features a high switching speed and a simple operation.

Figure 5:
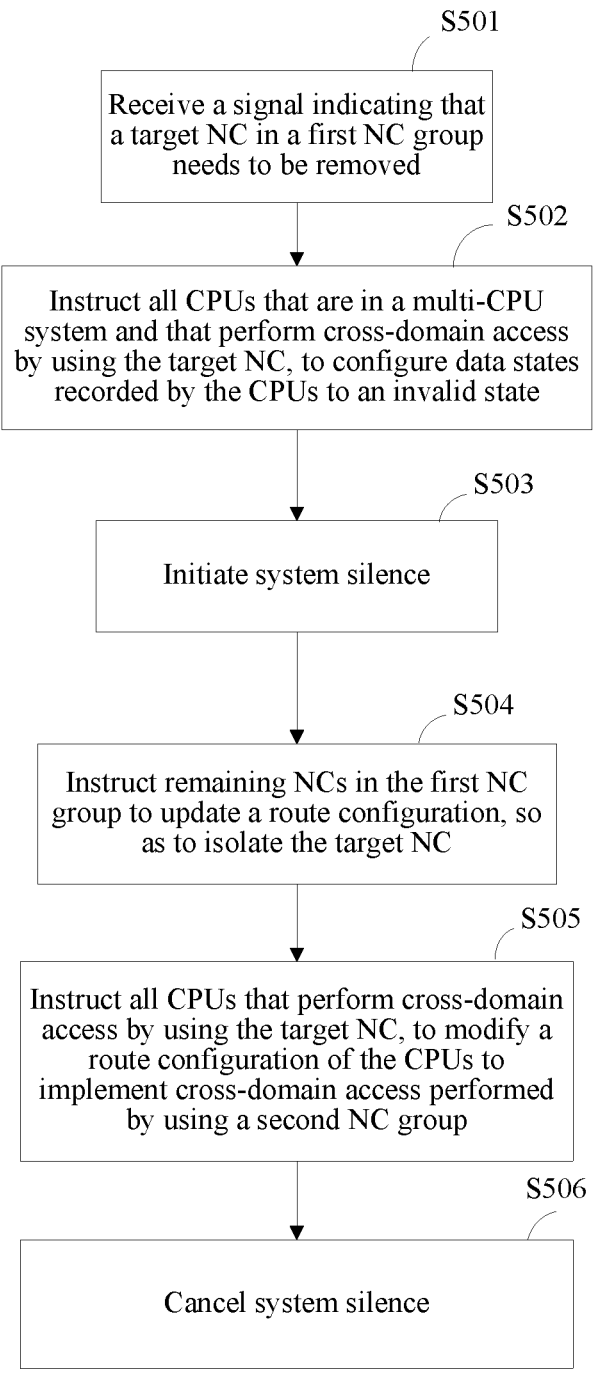
FIG. 5 is a flowchart of another NC removing method embodiment according to the present disclosure.

Referring to FIG. 5, this embodiment provides another NC hot removing method. After a target NC is removed, at least one NC among remaining NCs in the NC group in which the target NC is located can continue working normally, that is, can forward data. Compared with the solution in Embodiment 1, utilization efficiency of the NC is improved. The following describes this embodiment of the present disclosure in detail by still referring to the architecture in FIG. 2.

S501. A main CPU receives a signal indicating that a target NC in a first NC group needs to be removed.

The target NC is an NC to be removed, namely, an NC 211 in this embodiment. This step is the same as step S301, and is not repeated herein.

S502. The main CPU instructs all CPUs in a multi-CPU system that perform cross-domain access by using the target NC, to configure a data state recorded by the CPUs to an invalid state.

This step is similar to step S302. Reference may be made to the content of S302, and this step is not detailed herein. A difference is that in step S302, the data record of the CPU that performs cross-domain access by using the first NC group is configured to the invalid state; in step S502, the data record of the CPU that performs cross-domain access by using the target NC is configured to the invalid state, and recorded data states of other CPUs that perform cross-domain access by using other NCs in the first NC group rather than the target NC may keep unchanged. Therefore, in this patent, a range of affected CPUs is reduced.

The CPUs that perform cross-domain access by using the target NC include a CPU that performs cross-domain access by directly using the target NC, and also include a CPU that performs cross-domain access by indirectly using the target NC after an access request is forwarded by another NC or another CPU.

S503. The main CPU initiates system silence.

If the main CPU has multiple cores, the system silence range is all CPUs that include the main CPU. As mentioned above, if the main CPU has multiple cores, the main CPU may leave at least one core not to get silent, and remaining cores get silent; all cores of other CPUs get silent. The core not in the silent state in the main CPU is used to perform subsequent operations.

The silence process is the same as S303, and is not described in detail herein.

S504. The main CPU instructs remaining NCs in the first NC group to update a route configuration, so as to isolate the target NC.

Because the target NC needs to be removed, a signal transmission channel between remaining NCs in the first NC group needs to change. By means of route configuration on the remaining NCs in the first NC group, the target NC can be isolated to prevent other NCs from continuing sending information (such as a packet or management information) to the target NC. Therefore, routes recorded by the remaining NCs need to be updated. Not all remaining NCs in the first NC group need to update a route configuration. For example, a route configuration of an NC directly connected to the target NC may be updated, and a route configuration of remaining NCs keeps unchanged.

Optionally, a result of adjusting the first NC group in this step is equivalent to a route configuration of each NC in the first NC group in a case in which the target NC has never existed.

In this embodiment, after the NC 211 is removed, a signal channel among the NC 214, the NC 212, and the NC 211 disappears. Therefore, a route of an NC that is not removed in the NC group 21 needs to be reconfigured, including deletion of NC 211-related route information in the NC 214 and the NC 212 that are directly connected to the NC 211.

For example, in an original route configuration of the NC 214, if the QPI domain 23 needs to be accessed, a next NC to be traversed is the NC 211. Now the NC 211 needs to be removed. Therefore, in the route configuration of the NC 214, the next NC to be traversed for accessing the QPI domain 23 may be configured to the NC 212.

In addition, if data transmission from a CPU to an NC group is added, information about a route to a sink CPU may be added to a corresponding NC. The newly added route information records a port that points to the sink CPU. The route information may be obtained by the NC by learning in a process of performing an access transaction. If the information is not added, the access request may also be sent to the sink CPU in a broadcast manner.

For example, originally the CPU 231 performs cross-domain access to the CPU 241 by using the NC 211. After the NC 211 is removed, a cross-domain access request from the CPU 231 is taken over by the NC 221. Therefore, port information for accessing the CPU 241 may be added to a route configuration of the NC 221.

A result of adjusting the NC group 21 in this step is equivalent to a route configuration of each NC in the NC group 21 after the NC group 21 is connected to each QPI domain in a case in which the NC 211 has never existed.

The foregoing is a simple example rather than complete description. Especially, in a case in which there are more NCs in the QPI domain 21, adjustment of a route configuration of the NC in the NC group 21 is more complex.

Step S504 and subsequent step S505 are not order-sensitive, for example, they may be performed simultaneously or either step is performed first.

S505. The main CPU instructs all CPUs that perform cross-domain access by using the target NC, to modify their route configurations, so that all the CPUs that perform cross-domain access by using the target NC, switch to perform cross-domain access by using the second NC group.

The main CPU learns a topology of the entire multi-CPU system, that is, the main CPU knows connection relationships between the CPUs, and a port used by each CPU for external access. This step can be implemented by changing a port used by the target NC for accessing another QPI domain.

Principles of this step are the same as step S304. Reference may be made to S304, and no details are given herein. A difference is that fewer CPUs are switched in this step, that is, route configurations of fewer CPUs are changed.

After step S505, the NC can be removed.

S506. The main CPU cancels system silence.

For this step, reference may be made to step S305.

Embodiment 4

Figure 6:
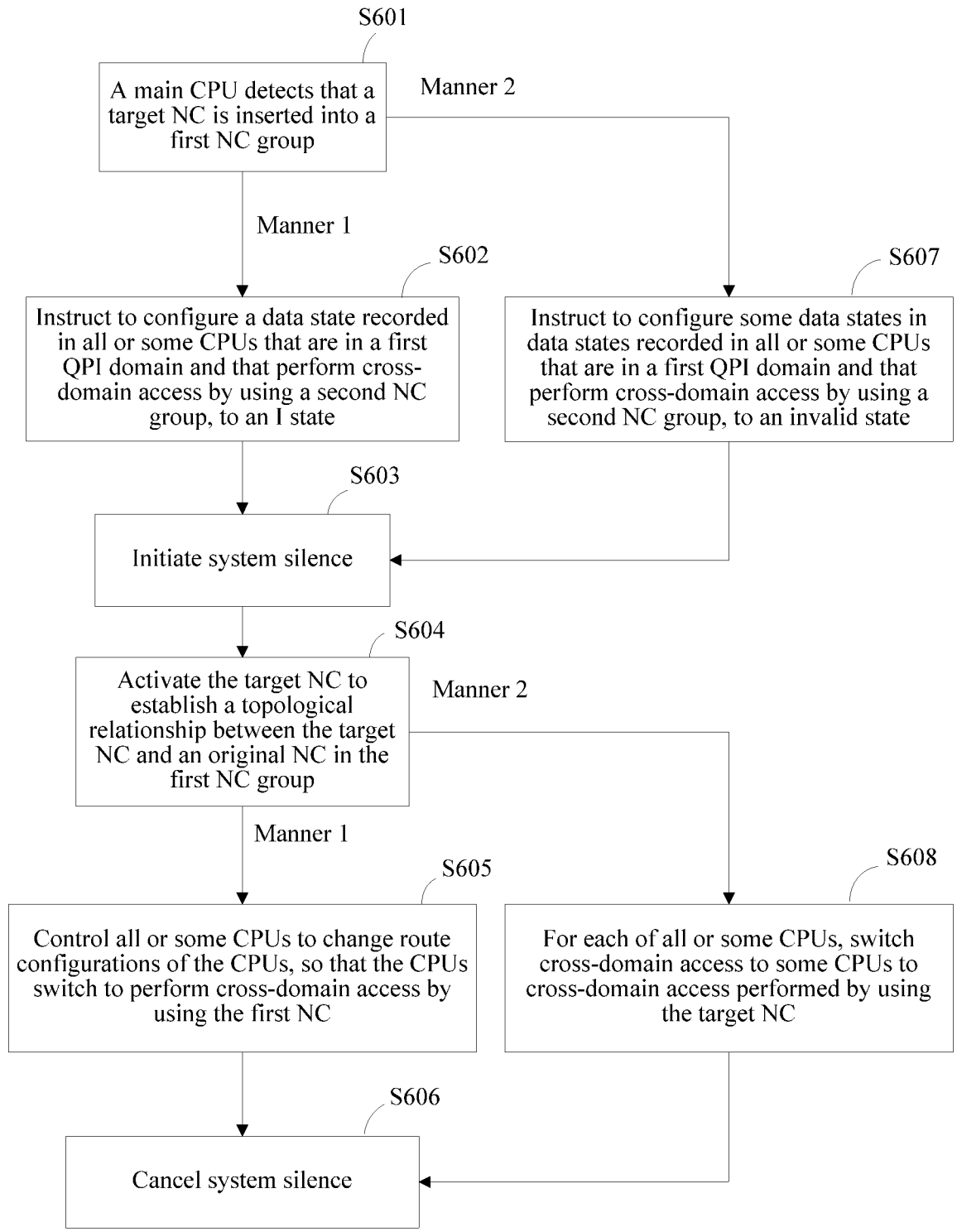
FIG. 6 is a flowchart of another NC adding method embodiment according to the present disclosure.

Referring to FIG. 6, in this embodiment, a new NC (hereinafter referred to as a target NC) is added into a first NC group in a case in which an existing NC in the first NC group is working, so as to implement joint working of the target NC and the existing NC in the first NC group. The target NC may be connected to a first QPI domain. At least one CPU that is in the first QPI domain and that performs cross-domain access by using a second NC group switches to perform cross-domain access by using the target NC.

For example, after an NC 211 is hot removed in Embodiment 3, a new NC 211 is hot added into the NC group 21. Therefore, the CPU 231 that is directly connected to the NC 211 may switch to access another QPI domain by using the target NC. This embodiment is similar to Embodiment 2 and differs in a relatively small range. In this embodiment, the CPUs whose cross-domain access route is switched are limited to CPUs in the first QPI domain; in Embodiment 2, such a limitation is not imposed. In addition, the CPU whose route is switched in this embodiment performs cross-domain access by using the target NC; in Embodiment 2, the CPU whose route is switched performs cross-domain access by using the first NC group. Because a main part of this embodiment is similar to Embodiment 2, for most content of this embodiment, reference may be made to Embodiment 2.

This embodiment may be performed after Embodiment 3 to jointly form an NC replacing method. This embodiment may also be performed separately so that a new NC is added to a normally running NC group.

S601. A main CPU detects that a target NC is added to a first NC group.

A normally working NC exists in the first NC group when S601 is being performed. That is, at least one NC is in a state ready for forwarding data, or even is forwarding data. In Embodiment 2, all NCs in the first NC group no longer work when step S401 is being performed.

This step is the same as step S401, and is not detailed herein.

S602. The main CPU instructs to configure a data state recorded in at least one CPU that is in a first QPI domain and that performs cross-domain access by using a second NC group, to an I state.

In this step, the CPU that needs to be configured to the I state is a CPU ready to perform route switching in a subsequent step.

Different algorithms may be used to select specific CPUs. For example, according to performance of the target NC, some CPUs that perform cross-domain access by using the second NC group are selected to transmit a packet by using the target NC.

As regards how to configure the data state recorded in the CPU to the I state, refer to step S402.

S603. The main CPU initiates system silence.

As regards how to perform the system silence, refer to step S403.

S604. Activate the target NC to establish a topological relationship between the target NC and an original NC in the first NC group.

Refer to step S404.

S605. The main CPU sends an instruction to control the at least one CPU to modify a route configuration of the at least one CPU, so that the at least one CPU switches to perform cross-domain access by using the first NC group. Specifically, a route configuration of a route register of each of the at least one CPU is modified, so that a port that is recorded in the route register and that accesses a CPU in another domain is configured to a port that performs cross-domain access by using the target NC, for example, configured to a port directly connected to the target NC among ports of the at least one CPU.

For details of this step, reference may be made to step S405, and no details are given herein. A difference is: in step S405, a QPI domain in which the CPU whose route configuration is modified is located is not determined; but in this embodiment, the CPU whose route configuration is modified is located in the first QPI domain.

S606. After the route is modified, the main CPU cancels system silence.

A process of canceling silence is similar to step S406, and reference may be made to step S406.

Similar to Embodiment 2, this embodiment of the present disclosure further provides a route switching method. Depending on different sink CPUs, a route to be switched is selected. In FIG. 6, the two manners are marked manner 1 and manner 2. Steps S601, S602, S603, S604, S605, and S606 are called manner 1. Steps S601, S607, S603, S604, S608, and S606 are called manner 2.

Manner 1 and manner 2 have two different steps. Among at least one CPU in the first QPI domain that performs cross-domain access by using the second NC group, depending on different sink CPUs that are accessed between domains, cross-domain access to some sink CPUs is switched to cross-domain access performed by using the first NC group, and cross-domain access to other sink CPUs is still performed by using the second NC group. It is equivalent to replacing step S602 with the following step S607 and replacing step S605 with step S608.

S607. The main CPU sends an instruction to the at least one CPU that is in the first QPI domain and that performs cross-domain access by using the second NC group, and the CPU that receives the instruction configures some of recorded data states to an invalid state. In other words, for a single CPU, data states recorded by the CPU are data states of data that comes from N cross-domain sink CPUs. In this step, data states of data that comes from M cross-domain sink CPUs are configured to the invalid state, where M<N.

For details and examples of this step, reference may be made to step S407, and no details are given herein. Compared with S407, a difference is: in step S607, the CPUs whose data state is configured to the invalid state are limited to the first QPI domain; in step S407, no QPI domain limitation is imposed.

S608. The main CPU instructs the at least one CPU that performs cross-domain access by using the second NC group, to switch cross-domain access to some sink CPUs to cross-domain access performed by using the first NC group. For example, cross-domain access to the CPU corresponding to the data state configured to the I state in step S607 is switched to cross-domain access performed by using the target NC. Specifically, in a route register of the CPU that performs cross-domain access, a port used for cross-domain access is configured to a port, connected to the target NC, of the CPU, and access to the sink CPUs corresponding to remaining data states may keep unchanged.

For this step, reference may be made to step S408.

It should be noted that the foregoing embodiments have described the multi-CPU system, and the present disclosure further provides an embodiment related to a computer, where the computer includes the foregoing multi-CPU system and further includes a BIOS, where the BIOS provides a program for a main CPU, and the main CPU sends a management instruction and a control instruction by running the program. The CPU may also be a processor that is connected by using a CC bus and perform communication by using an NC. A QPI bus may be used between a QPI domain and an NC group, and a QPI bus or another bus may be used between NCs.

Each aspect of the present disclosure or a possible implementation manner of each aspect may be specifically implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

Obviously, a person skilled in the art can make various modifications and variations to the present disclosure. The present disclosure is intended to cover these modifications and variations provided that they fall within the scope of protection defined by the following claims and their equivalent technologies.

What is claimed is:

1. A multi-Central Processing Unit (CPU) system management method, comprising:
    determining, by a main CPU, that a Node Controller (NC) in a first NC group is to be removed, wherein the main CPU manages the multi-CPU system that comprises: a first NC group coupled to a first Quick-Path Interconnect (QPI) domain and a second QPI domain, and a second NC group coupled to the first QPI domain and the second QPI domain, wherein each of the first QPI domain and the second QPI domain comprises a plurality of CPUs, wherein each of the first NC group and the second NC group separately comprises a main NC and at least two sub-NCs, wherein the main NC is directly connected to the at least two sub-NCs, wherein each of the at least two sub-NCs are directly connected to at least one of the at least two sub-NCs, and the main NC is configured to implement interconnection of the sub-NCs in same NC group, wherein the main CPU is selected from the plurality of CPUs in the first QPI domain or the second QPI domain, wherein the first NC group comprises a first NC and a second NC and the first NC and the second NC are the sub-NCs, wherein the first NC is directly connected to a CPU in the first QPI domain and the second NC is directly connected to a CPU in the second QPI domain, wherein the second NC group comprises a third NC and a fourth NC and the third NC and the fourth NC are the sub-NCs, and wherein the third NC is directly connected to a CPU in the first QPI domain and the fourth NC is directly connected to a CPU in the second QPI domain;
    obtaining, by the main CPU, a topological relationship among CPUs in the multi-CPU system;
    determining, by the main CPU according to the topological relationship, at least one CPU which use the to be removed NC to perform cross-domain access;
    instructing, by the main CPU, the at least one CPU to modify each CPU route configuration, wherein the modified CPU route configuration indicates that the at least one CPU uses the second NC group to perform cross-domain access;
    updating, by the main CPU after a target NC is added into the first NC group, the topological relationship, wherein the target NC comprises the removed NC or a new NC; and
    controlling, by the main CPU, the at least one CPU to modify each CPU route configuration, wherein the modified CPU route configuration indicates that the at least one CPU uses the first NC group to perform cross-domain access.

2. The multi-CPU system management method according to claim 1, wherein the instructing the at least one CPU to modify each CPU route configuration, comprising:
    instructing, by the main CPU, the at least one CPU to set a recorded data state to an invalid state;
    initiating, by the main CPU, system silence to cause all CPUs in the multi-CPU system enter a silent state;
    instructing, by the main CPU, the at least one CPU to modify a first cross-domain access port information in a route register to a second cross-domain access port information, wherein the first cross-domain access port information is related to a first cross-domain access port coupled to the first NC group, the second cross-domain access port information is related to a second cross-domain access port, the first cross-domain access port is coupled to the first NC group, the second cross-domain access port is coupled to the second NC group, the first cross-domain access port information indicates the at least one CPU a first port for performing cross-domain access via the first NC group, the second cross-domain access port information indicates the at least one CPU a second port for performing cross-domain access via the second NC group; and
    initiating, by the main CPU, cancellation of system silence.

3. The multi-CPU system management method according to claim 2, wherein the instructing the at least one CPU comprises:
    instructing the at least one CPU to flush data in a cache, so as to set a modified state in data states to the invalid state, wherein the data states are recorded by the at least one CPU; and
    instructing all NCs in the first NC group to broadcast share-state and exclusive-state data states, so as to change a shared state and an exclusive state in the data states to the invalid state, wherein the data states are recorded by the at least one CPU.

4. The multi-CPU system management method according to claim 2, wherein the main CPU is configured to initiate system silence to cause all CPUs in the multi-CPU system to enter the silent state by:
    making remaining cores except one or more reserved cores in the main CPU silent; and
    making all cores of other CPUs in the multi-CPU system silent.

5. The multi-CPU system management method according to claim 1, further comprising:
    after a target NC is added to the first NC group, instructing, by the main CPU, at least one CPU that performs cross-domain access by using the second NC group, to configure a recorded data state to the invalid state;
    initiating, by the main CPU, system silence to configure all CPUs in the multi-CPU system to a silent state;
    establishing, by the main CPU, a topological relationship between the target NC and an original NC in the first NC group;
    instructing, by the main CPU, the at least one CPU to configure a port that is in a route register and that accesses a CPU in another domain, to a port that performs cross-domain access by using the first NC group; and initiating, by the main CPU, cancellation of system silence.

6. The multi-CPU system management method according to claim 1, wherein the method further comprising:

after a target NC is added to the first NC group and establishes a topological relationship with an original NC in the first NC group, controlling, by the main CPU, at least one CPU that performs cross-domain access by using the second NC group, to switch, depending on different cross-domain sink CPUs that are accessed between domains and by modifying a route configuration, cross-domain access to some cross-domain sink CPUs to cross-domain access performed by using the first NC group.

7. The multi-CPU system management method according to claim 1, further comprising:

after a target NC is added into the first NC group, sending, by the main CPU, an instruction to at least one CPU that performs cross-domain access by using the second NC group to instruct the at least one CPU to set data states corresponding to M cross-domain sink CPUs in recorded data states to an invalid state, wherein the data states recorded by the CPU correspond to a total of N cross-domain sink CPUs, and M<N;

initiating, by the main CPU, system silence to configure all CPUs in the multi-CPU system to a silent state;

modifying, by the main CPU, a route register configuration of the at least one CPU, so as to configure a port that is in a route register and that accesses the M cross-domain sink CPUs, to a port that performs cross-domain access by using the first NC group; and cancelling, by the main CPU, system silence after finishing modifying the route register configuration.

8. The multi-CPU system management method according to claim 7, wherein the M cross-domain sink CPUs are directly connected to the first NC group.

9. The multi-CPU system management method according to claim 7, wherein the main CPU instructs the at least one CPU to set data states corresponding to M cross-domain sink CPUs in recorded data states to an invalid state by:

instructing the at least one CPU to flush data in a cache of the M cross-domain sink CPUs, so as to configure a modified state in the data states corresponding to the M cross-domain sink CPUs to the invalid state; and instructing an NC in the second NC group to broadcast share-state and exclusive-state data states in the recorded data states corresponding to the M cross-domain sink CPUs, so as to configure a shared state and an exclusive state in the data states corresponding to the M cross-domain sink CPUs to the invalid state.

10. A multi-Central Processing Unit (CPU) system, comprising:

a first Node Controller (NC) group connected to a first Quick-Path Interconnect (QPI) domain and a second QPI domain; and a second NC group connected to the first QPI domain and the second QPI domain, wherein each of the first QPI domain and the second QPI domain comprises a plurality of CPUs, wherein each of the first NC group and the second NC group separately comprises a main NC and at least two sub-NCs, wherein the main NC is directly connected to the at least two sub-NCs, wherein each of the at least two sub-NCs are directly connected to at least one of the at least two sub-NCs, and the main NC is configured to implement interconnection of the sub-NCs in same NC group NCs, wherein the first NC group comprises a first NC and a second NC, the first NC is connected to a CPU in the first QPI domain and the second NC is connected to CPUs in the second QPI domain, wherein the second NC group comprises a third NC and a fourth NC, the third NC is connected to a CPU in the first QPI domain and the fourth NC is connected to a CPU in the second QPI domain, and wherein a main CPU is selected from the plurality of CPUs in the first QPI domain or the second QPI domain and the main CPU is configured to:

determine that a NC in the first NC group is to be removed;

obtain a topological relationship among CPUs in the multi-CPU system;

determine, according to the topological relationship, at least one CPU which use the to be removed NC to perform cross-domain access; and instruct the at least one CPU to modify each CPU route configuration, wherein the modified each CPU route configuration indicates that the at least one CPU uses the second NC group to perform cross-domain access;

updating, after a target NC is added into the first NC group, the topological relationship, wherein the target NC comprises the removed NC or a new NC;

controlling the at least one CPU to modify each CPU route configuration, wherein the modified CPU route configuration indicates that the at least one CPU uses the first NC group to perform cross-domain access.

11. The multi-CPU system according to claim 10, wherein the main CPU is further configured to:

instruct the at least one CPU to set a recorded data state to an invalid state;

initiate system silence to cause all CPUs in the multi-CPU system enter a silent state;

instruct the at least one CPU to modify a first cross-domain access port information in a route register to a second cross-domain access port information, wherein the first cross-domain access port information is related to a first cross-domain access port coupled to the first NC group, the second cross-domain access port information is related to a second cross-domain access port, the first cross-domain access port is coupled to the first NC group, the second cross-domain access port is coupled to the second NC group, the first cross-domain access port information indicates the at least one CPU a first port for performing cross-domain access via the first NC group, the second cross-domain access port information indicates the at least one CPU a second port for performing cross-domain access via the second NC group; and initiate cancellation of system silence.

12. The multi-CPU system according to claim 11, wherein the main CPU is further configured to:

instruct the at least one CPU to flush data in a cache, so as to set a modified state in data states to the invalid state, wherein the data states are recorded by the at least one CPU; and instruct all NCs in the first NC group to broadcast share-state and exclusive-state data states, so as to change a shared state and an exclusive state in the data states to the invalid state, wherein the data states are recorded by the at least one CPU.

13. The multi-CPU system according to claim 10, wherein the main CPU is further configured to:

make remaining cores except one or more reserved cores in the main CPU silent; and make all cores of other CPUs in the multi-CPU system silent.

14. The multi-CPU system according to claim 10, wherein the main CPU is further configured to:

after a target NC is added to the first NC group, instruct at least one CPU that performs cross-domain access by using the second NC group, to configure a recorded data state to the invalid state;

initiate system silence to configure all CPUs in the multi-CPU system to a silent state;

establish a topological relationship between the target NC and an original NC in the first NC group;

instruct the at least one CPU to configure a port that is in a route register and that accesses a CPU in another domain, to a port that performs cross-domain access by using the first NC group; and initiate cancellation of system silence.

15. The multi-CPU system according to claim 10, wherein the main CPU is further configured to:

after a target NC is added to the first NC group and establishes a topological relationship with an original NC in the first NC group, control at least one CPU that performs cross-domain access by using the second NC group, to switch, depending on different cross-domain sink CPUs that are accessed between domains and by modifying a route configuration, cross-domain access to some cross-domain sink CPUs to cross-domain access performed by using the first NC group.

16. The multi-CPU system according to claim 10, wherein the main CPU is further configured to:

after a target NC is added into the first NC group, send an instruction to at least one CPU that performs cross-domain access by using the second NC group to instruct the at least one CPU to set data states corresponding to M cross-domain sink CPUs in recorded data states to an invalid state, wherein the data states recorded by the CPU correspond to a total of N cross-domain sink CPUs, and M<N;

initiate system silence to configure all CPUs in the multi-CPU system to a silent state;

modify a route register configuration of the at least one CPU, so as to configure a port that is in a route register and that accesses the M cross-domain sink CPUs, to a port that performs cross-domain access by using the first NC group; and cancel system silence after finishing modifying the route register configuration.

17. The multi-CPU system according to claim 16, wherein the M cross-domain sink CPUs are directly connected to the first NC group.

18. The multi-CPU system according to claim 16, wherein the main CPU is further configured to:

instruct the at least one CPU to flush data in a cache of the M cross-domain sink CPUs, so as to configure a modified state in the data states corresponding to the M cross-domain sink CPUs to the invalid state; and instruct an NC in the second NC group to broadcast share-state and exclusive-state data states in the recorded data states corresponding to the M cross-domain sink CPUs, so as to configure a shared state and an exclusive state in the data states corresponding to the M cross-domain sink CPUs to the invalid state.

* * * * *